United States Patent
Sugano et al.

(10) Patent No.: US 11,094,943 B2
(45) Date of Patent: Aug. 17, 2021

(54) PROCESSING APPARATUS FOR GAS-DIFFUSION LAYER SHEETS

(71) Applicant: HONDA MOTOR CO., LTD., Tokyo (JP)

(72) Inventors: Tetsuya Sugano, Tochigi (JP); Satoshi Oyama, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 168 days.

(21) Appl. No.: 16/570,110

(22) Filed: Sep. 13, 2019

(65) Prior Publication Data

US 2020/0136149 A1    Apr. 30, 2020

(30) Foreign Application Priority Data

Oct. 26, 2018    (JP) .............................. JP2018-201758

(51) Int. Cl.
| | | |
|---|---|---|
| *H01M 8/10* | (2016.01) | |
| *H01M 4/88* | (2006.01) | |
| *H01M 8/0245* | (2016.01) | |
| *H01M 8/1004* | (2016.01) | |
| *B29C 65/50* | (2006.01) | |
| *H01M 8/0234* | (2016.01) | |
| *H01M 8/1018* | (2016.01) | |

(52) U.S. Cl.
CPC ........... *H01M 4/8807* (2013.01); *B29C 65/50* (2013.01); *H01M 4/8882* (2013.01); *H01M 4/8896* (2013.01); *H01M 8/0234* (2013.01); *H01M 8/0245* (2013.01); *H01M 8/1004* (2013.01); *H01M 2008/1095* (2013.01)

(58) Field of Classification Search
CPC ............. H01M 4/8807; H01M 4/8882; H01M 4/8896; H01M 8/0234; H01M 8/0245; H01M 8/1004; H01M 2008/1095; B29C 65/50
See application file for complete search history.

(56) References Cited

U.S. PATENT DOCUMENTS

| | | | | |
|---|---|---|---|---|
| 2011/0286910 A1* | 11/2011 | Lee | .......................... | D04H 1/64 423/445 R |
| 2013/0122394 A1* | 5/2013 | Shintani | .................. | H01M 4/88 429/481 |
| 2018/0290441 A1* | 10/2018 | Adachi | .................... | B32B 37/08 |

FOREIGN PATENT DOCUMENTS

JP          5979100          8/2016

* cited by examiner

*Primary Examiner* — Raymond Alejandro
(74) *Attorney, Agent, or Firm* — Rankin, Hill & Clark LLP

(57) ABSTRACT

The processing apparatus includes: a first roller 10 around which a gas-diffusion layer sheet (carbon paper CP) is wound, the gas-diffusion layer sheet being an electrically conductive porous member; a second roller 20 configured to take up the carbon paper CP wound around the first roller 10; and a processing oven configured to heat process a portion of the carbon paper CP, the portion having been fed from the first roller 10 but not yet taken up by the second roller 20. A heat-resistant lead LE is provided, the heat-resistant lead LE having a length at least extending from the first roller 10 to the second roller 20 through the processing oven, being configured to be taken up by the second roller 20, and being bonded to the carbon paper CP impregnated with a thermosetting resin AD.

5 Claims, 3 Drawing Sheets

PROCESSING APPARATUS FOR GAS-DIFFUSION LAYER SHEETS

This application is based on and claims the benefit of priority from Japanese Patent Application No. 2018-201758, filed on 26 Oct. 2018, the content of which is incorporated herein by reference.

BACKGROUND OF THE INVENTION

Field of the Invention

The present disclosure relates to a processing apparatus for gas-diffusion layer sheets for use in fuel cells and the like.

Related Art

Known fuel cells include a membrane-electrode assembly which is comprised of an electrolyte membrane having an anode electrode catalyst layer attached to one surface thereof and a cathode electrode catalyst layer attached to the other surface thereof, the electrode catalyst layers each having a catalyst that promotes fuel cell reaction. The membrane-electrode assembly is produced in the following manner. A long electrolyte membrane sheet and a support sheet having an electrode catalyst layer formed thereon are superposed on each other. The electrode catalyst layer is attached to one surface of the electrolyte membrane, and then transferred using a transfer roller. A dummy sheet is connected to a back sheet on which the electrolyte membrane sheet has been formed, and tapes are attached onto the front and back surfaces of the connection portion between the dummy sheet and the back sheet (for example, Patent Document 1).

Patent Document 1: Japanese Patent No. 5979100

SUMMARY OF THE INVENTION

According to the above-mentioned publication, the dummy sheet and the back sheet having the electrolyte membrane sheet formed thereon are connected to each other by means of the tapes. However, no consideration is given to the resistance of the tapes to the heat of a drying oven. Therefore, there are the following problems: the tapes, which cannot maintain their bonding strength in the drying oven, may come off and/or may exert an adverse effect on the electrolyte membrane sheet to be provided as a product; and wrinkles form in the electrolyte membrane sheet.

It is therefore an object of the present disclosure to provide a processing apparatus for gas-diffusion layer sheets, the processing apparatus being configured such that substantially no adverse effect is exerted on a product in a processing oven such as a drying oven that performs heat processing, and wrinkles are less likely to form in the product.

To achieve the object described above, the present disclosure provides a processing apparatus for gas-diffusion layer sheets (e.g., a processing apparatus 1 for gas-diffusion layer sheets to be described later), the processing apparatus including: a first roller (e.g., a feeding roller 10 to be described later) around which a gas-diffusion layer sheet (e.g., carbon paper CP to be described later) is wound, the gas-diffusion layer sheet being an electrically conductive porous member; a second roller (e.g., a take-up roller 20 to be described later) configured to take up the gas-diffusion layer sheet wound around the first roller; and a processing oven (e.g., a drying oven 30 to be described later) configured to heat process a portion of the gas-diffusion layer sheet, the portion having been fed from the first roller but not yet taken up by the second roller. A heat-resistant lead (e.g., a heat-resistant lead LE to be described later) is provided, the heat-resistant lead having a length at least extending to the second roller through the processing oven, being configured to be taken up by the second roller, and being bonded to the gas-diffusion layer sheet impregnated with a thermosetting resin (e.g., an adhesive AD to be described later).

According to the present disclosure, the gas-diffusion layer sheet impregnated with the thermosetting resin is bonded to the heat-resistant lead. This feature makes it possible to reduce wrinkles, while ensuring that the portion with the thermosetting resin has heat resistance and maintains its bonding strength. Thus, the heat resistance of the bonded joint is ensured, thereby substantially preventing the thermosetting resin from exerting adverse effect on the gas-diffusion layer sheet in the processing oven.

Further, since the heat-resistant lead and the gas-diffusion layer sheet are bonded together with the thermosetting resin, solvent vapor resulting from vaporization of the solvent contained in the thermosetting resin can be easily released through the porous carbon paper. This feature makes it possible to reduce the formation of wrinkles in the carbon paper when the thermosetting resin that has been dried is cooled.

The heat-resistant lead has, in a portion thereof, an anti-wrinkle part (e.g., a cut CU to be described later) for substantially eliminating wrinkles that have formed in the gas-diffusion layer sheet, the portion with the anti-wrinkle part being adjacent to another portion, of the heat-resistant lead, to which the gas-diffusion layer sheet is bonded. The anti-wrinkle part is comprised of a cut (e.g., the cut CU to be described later) formed in the portion of the heat-resistant lead.

Thus, the cut formed in the heat-resistant lead can reliably reduce the formation of wrinkles in the gas-diffusion layer sheet when the thermosetting resin that has been dried is cooled.

The thermosetting resin is applied to a longitudinal end portion of the heat-resistant lead such that the applied thermosetting resin is in the shape of a single continuous line extending in a width direction of the heat-resistant lead, from a vicinity of one end to a vicinity of an other end in the width direction of the heat-resistant lead, thereby bonding the heat-resistant lead to the carbon paper. Therefore, the solvent vapor resulting from vaporization of the solvent contained in the thermosetting resin can be easily released through the porous carbon paper. Further, when the thermosetting resin that has been dried is cooled, the gas-diffusion layer is less likely to get wrinkles, and is reliably bonded.

In addition, in the processing apparatus of the present disclosure, the longitudinal end portion of the gas-diffusion layer sheet is impregnated with the thermosetting resin, and the thermosetting resin is heated and cured in a state where the gas-diffusion layer sheet is positioned on top of the heat-resistant lead, thereby bonding the gas-diffusion layer sheet and the heat-resistant lead to each other. Therefore, the solvent vapor resulting from vaporization of the solvent contained in the thermosetting resin can be suitably released through the porous gas-diffusion layer sheet. This feature makes it possible to further reduce the formation of wrinkles in the gas-diffusion layer sheet when the thermosetting resin that has been dried is cooled.

The present disclosure provides a processing apparatus for gas-diffusion layer sheets, the processing apparatus being configured such that substantially no adverse effect is exerted on a product in a processing oven that performs heat processing, and wrinkles are less likely to form in the product.

DETAILED DESCRIPTION OF THE INVENTION

Figure 1:
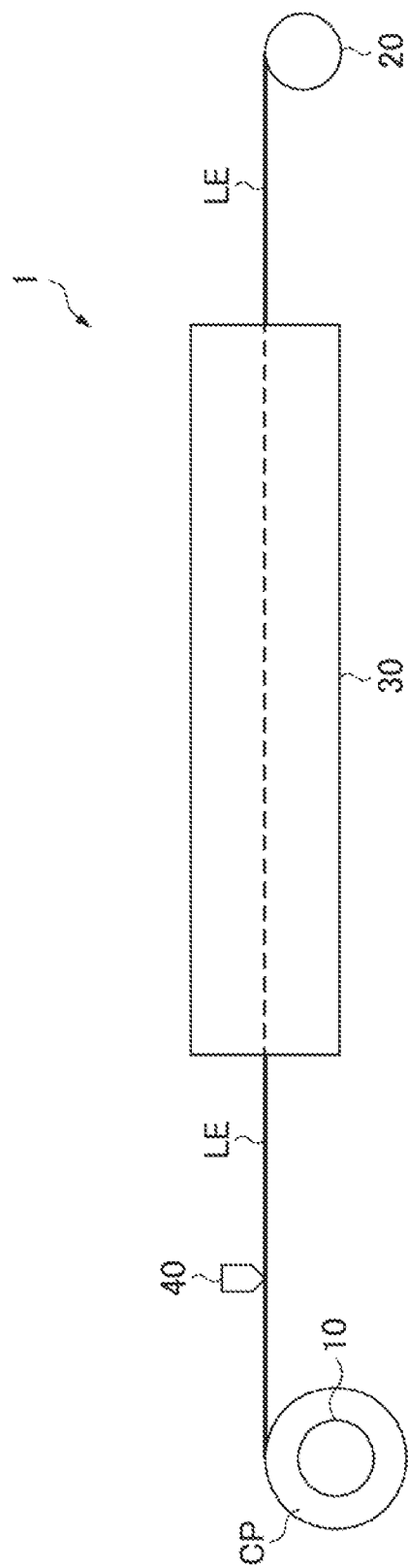
FIG. 1 is a schematic diagram showing a processing apparatus for gas-diffusion layer sheets according to the present disclosure.

Embodiments of the present disclosure will be described below with reference to the drawings. FIG. 1 is a schematic diagram showing a processing apparatus 1 for gas-diffusion layer sheets.

The processing apparatus 1 for gas-diffusion layer sheets is intended to form electrolyte membranes and the like, by cutting carbon paper CP (a gas-diffusion layer sheet), which is to constitute a gas-diffusion layer of a fuel cell, into a predetermined size, and by applying coatings to the carbon paper CP so that electrodes, a water repellent layer, and the like are formed. As shown in FIG. 1, the processing apparatus 1 includes a feeding roller 10, a take-up roller 20, a drying oven 30 as a processing oven for performing heat processing, and a die head 40.

The carbon paper CP is wound around the feeding roller 10 in advance. The feeding roller 10 feeds the carbon paper CP toward the take-up roller 20. The die head 40 applies coatings to the carbon paper CP fed from the feeding roller 10 so that electrodes, a gas-diffusion layer, and a water-repellent layer are formed. The interior of the drying oven 30 is in a high-temperature atmosphere at, for example, about 400° C. The carbon paper CP, to which the electrodes, the gas-diffusion layer, and the water repellent layer have been applied by the die head 40, is passed through the interior of the drying oven 30, so that the carbon paper CP is heat processed and dried. The take-up roller 20 takes up the carbon paper CP having the electrodes, the water repellent layer, and the gas-diffusion layer formed thereon.

A heat-resistant lead LE is bonded to a front end portion of the carbon paper CP to be fed from the feeding roller 10. The heat-resistant lead LE is comprised of a resin film made of a polyimide material and having the same width as that of the carbon paper CP. The heat-resistant lead LE, of which one end portion is fixed to the take-up roller 20, is configured to be wound around the take-up roller 20.

The heat-resistant lead LE has a length extending from the feeding roller 10 to the take-up roller 20 through the die head 40 and the drying oven 30. The other end portion of the heat-resistant lead LE is bonded to the front end portion of the carbon paper CP to be fed from the feeding roller 10 with an adhesive AD (see FIG. 2) comprised of a polyimide-based thermosetting resin, i.e., the so-called varnish. It is suitable that the heat-resistant lead LE is long enough to reach the take-up roller 20 through the drying oven 30. A similar heat-resistant lead is bonded to a rear end portion of the carbon paper CP with the above-described adhesive AD (see FIG. 2) comprised of the polyimide-based thermosetting resin. This heat-resistant lead has a length at least extending to the feeding roller 10 through the drying oven 30, and preferably a length corresponding to the distance between the feeding roller 10 and the take-up roller 20.

Figure 2:
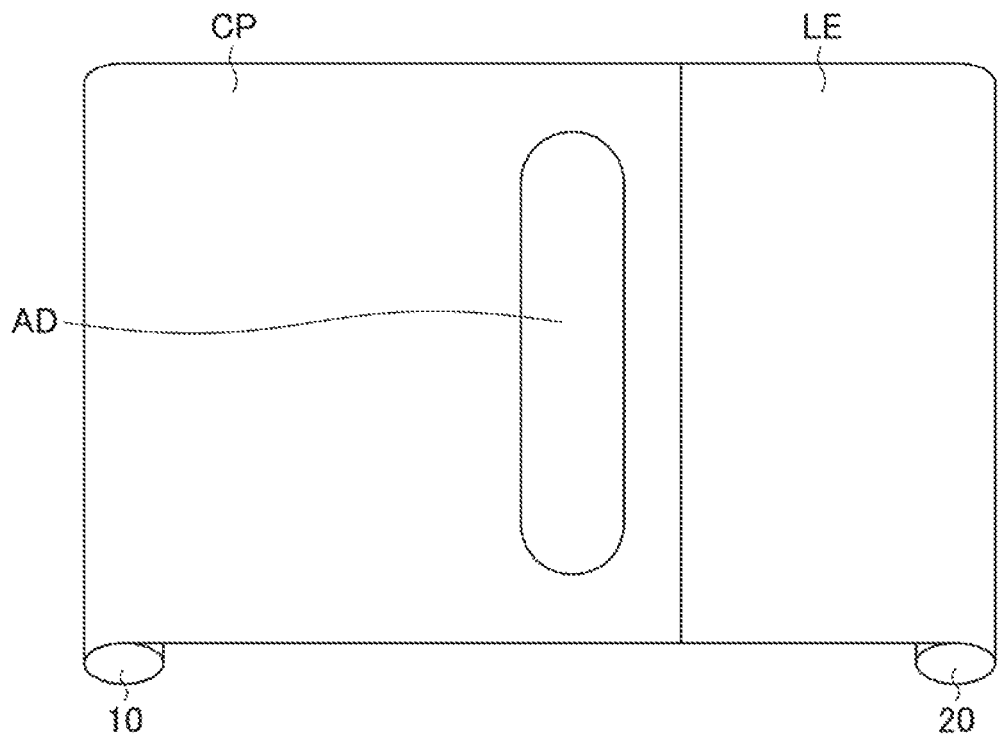
FIG. 2 is a schematic diagram showing a bonded joint of a gas-diffusion layer sheet and a heat-resistant lead, in the processing apparatus for gas-diffusion layer sheets according to the present disclosure.

Thus, following the heat-resistant lead LE that has passed through the die head 40 and the drying oven 30 and then has been taken up by the take-up roller 20, the carbon paper CP passes through the die head 40 and the drying oven 30 to be taken up by the take-up roller 20 in the same manner. FIG. 2 is a schematic diagram showing the bonded joint of the carbon paper CP and the heat-resistant lead LE in the processing apparatus 1 for gas-diffusion layer sheets.

The other end portion of the heat-resistant lead LE and the front end portion of the carbon paper CP are bonded together via the adhesive AD in a state where the carbon paper CP is positioned on top of the heat-resistant lead LE. More specifically, the bonding of the other end of the heat-resistant lead LE and the front end portion of the carbon paper CP is implemented in the following manner.

Figure 3:
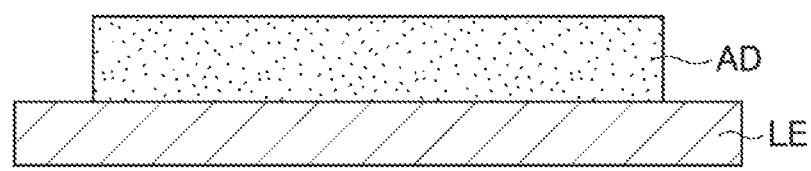
FIG. 3 is a schematic side view showing a cross section of the heat-resistant lead to which a thermosetting resin has been applied, in the processing apparatus for gas-diffusion layer sheets according to the present disclosure.
Figure 4:
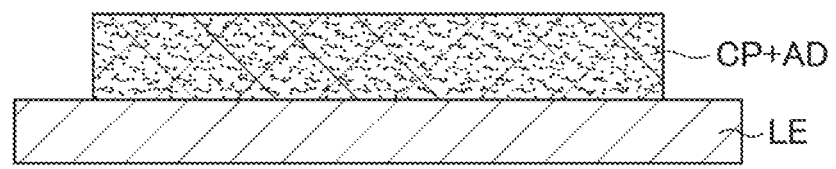
FIG. 4 is a schematic side view showing a cross section of the heat-resistant lead and the gas-diffusion layer sheet that have been bonded together via the thermosetting resin, in the processing apparatus for gas-diffusion layer sheets according to the present disclosure.

First, as shown in FIG. 3, the adhesive AD is applied to the upper surface of the other end portion of the heat-resistant lead LE. The application of the adhesive AD is carried out so that on the upper surface of the other end portion of the heat-resistant lead LE, the applied adhesive AD is in the shape of a single continuous line extending in the width direction of the heat-resistant lead LE, and more specifically, an oval shape as shown in FIG. 2. Next, as shown in FIG. 4, the front end portion of the carbon paper CP is superposed from above on the heat-resistant lead LE to which the adhesive AD has been applied, so that the front end portion of the carbon paper CP is bonded to the other end portion of the heat-resistant lead LE. As a result, as shown in FIG. 2, the adhesive AD applied in the oval shape spreads, and the front end portion of the carbon paper CP is impregnated with the adhesive AD. FIG. 3 is a schematic side view showing a cross section of the heat-resistant lead LE to which the adhesive AD has been applied, in the processing apparatus 1 for gas-diffusion layer sheets. FIG. 4 is a schematic side view showing a cross section of the heat-resistant lead LE and the carbon paper CP that have been bonded together via the adhesive AD, in the processing apparatus 1 for gas-diffusion layer sheets.

Figure 5:
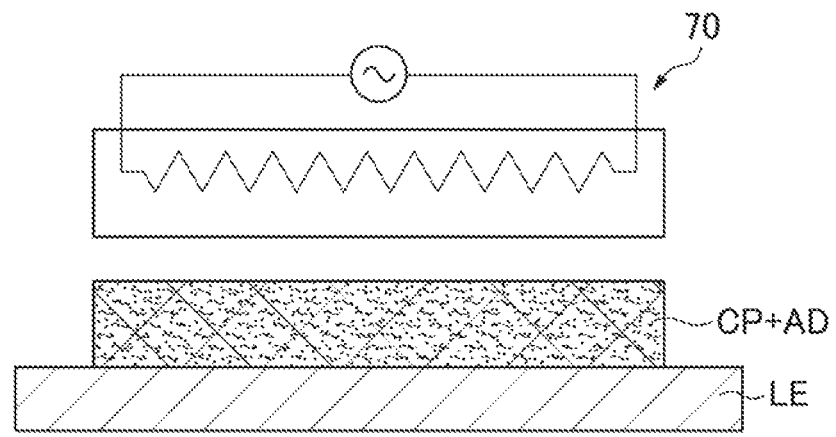
FIG. 5 is a schematic side view showing, in cross section, curing of the thermosetting resin via which the heat-resistant lead is bonded to the gas-diffusion layer sheet, in the processing apparatus for gas-diffusion layer sheets according to the present disclosure.

Next, as shown in FIG. 5, the thus bonded joint is heated and dried with a heater 70 so that that the adhesive AD is cured. As a result, the solvent contained in the adhesive AD is vaporized and released through the carbon paper CP, which is porous. At the time of this heat-bonding, the heat-resistant lead LE and the carbon paper CP are allowed to expand freely. In the manner described above, the other end portion of the heat-resistant lead LE and the front end portion of the carbon paper CP are bonded to each other. FIG. 5 is a schematic side view showing, in cross section, curing of the adhesive AD via which the heat-resistant lead LE and the carbon paper CP are bonded to each other, in the processing apparatus 1 for gas-diffusion layer sheets.

According to the present embodiment, the following beneficial effects are achieved. According to the present embodiment, the processing apparatus 1 for gas-diffusion layer sheets includes: the feeding roller 10 as a first roller around which the carbon paper CP has been wound; the take-up roller 20 as a second roller configured to take up the carbon paper CP that has been wound around the feeding roller 10; and the drying oven 30 as a processing oven configured to heat process a portion of the carbon paper CP, the portion having been fed from the feeding roller 10 but not yet taken up by the take-up roller 20. Further, the heat-resistant lead LE that has a length extending to the take-up roller 20 through the drying oven 30, and that is configured to be taken up by the take-up roller 20 is provided. The heat-resistant lead LE is bonded to carbon paper CP impregnated with the adhesive AD comprised of a thermosetting resin.

As a result, the carbon paper CP, which has been impregnated with the adhesive AD comprised of the thermosetting resin, is bonded to the heat-resistant lead LE. This feature makes it possible to maintain the bonding durability of the bonded joint, and to reduce wrinkles, while ensuring that the bonded joint is resistant to a high temperature of about 400° C. As can be seen, since the heat resistance of the bonded joint is ensured, the adhesive AD can be substantially prevented from exerting adverse effects on the carbon paper CP inside the drying oven 30. In addition, since the heat-resistant lead LE and the carbon paper CP are bonded together with the adhesive AD, the solvent contained in the adhesive AD can be vaporized and then released through the porous carbon paper CP. Therefore, when the adhesive AD that has been dried is cooled, the formation of wrinkles can be reduced in the carbon paper CP.

The adhesive AD comprised of the thermosetting resin is applied to the longitudinal end portion of the heat-resistant lead LE such that the applied adhesive AD is in the shape of a single continuous line extending in the width direction of the heat-resistant lead LE, from a vicinity of one end to a vicinity of the other end in the width direction of the heat-resistant lead LE, thereby bonding the heat-resistant lead LE to the carbon paper CP. Therefore, when the adhesive AD that has been dried is cooled, solvent vapor resulting from vaporization of the solvent contained in the thermosetting resin can be easily released through the porous carbon paper CP. Consequently, the carbon paper CP is less likely to get wrinkles, and is bonded reliably.

The present disclosure is not limited to the above-described embodiment, but encompasses any variations, improvements, and the like within the scope of achieving the object of the present disclosure. For example, the heat-resistant lead LE may have, in a portion thereof, an anti-wrinkle part for substantially eliminating wrinkles that have formed in the carbon paper CP, the portion with the anti-wrinkle part is adjacent to another portion, of the heat-resistant lead LE, to which the carbon paper CP is bonded.

Figure 6:
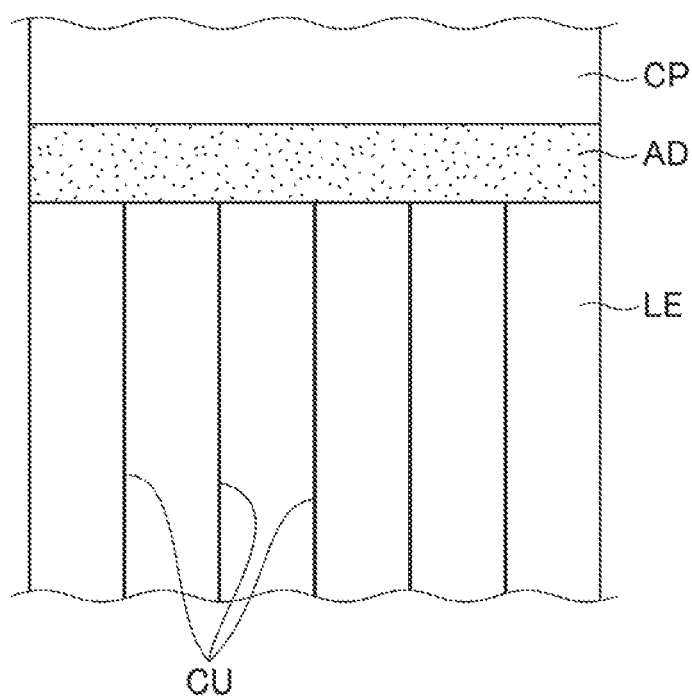
FIG. 6 is a schematic plan view showing a bonded joint of a gas-diffusion layer sheet and a heat-resistant lead, in a processing apparatus for gas-diffusion layer sheets according to a modification of the present disclosure.

Specifically, for example, the anti-wrinkle part is comprised of cuts CU formed in the portion of the heat-resistant lead LE. As shown in FIG. 6, the plurality of cuts CU have a length of 15 cm to 20 cm and extend parallel to one another toward the one end portion of the heat-resistant lead LE from an edge of a region where the other end portion of the heat-resistant lead LE and the front end portion of the carbon paper CP are superposed on each other, the region being included in bonded joint of the other end portion of the heat-resistant lead LE and the front end portion of the carbon paper CP. The interval between the cuts CU in the width direction of the heat-resistant lead LE is about 8 cm.

As can be seen, the portion of the heat-resistant lead LE that is adjacent to the other portion of the heat-resistant lead LE to which the carbon paper CP is bonded is provided with the anti-wrinkle part for substantially eliminating wrinkles that have formed in the carbon paper CP. The anti-wrinkle part is comprised of the cuts CU formed in the portion of the heat-resistant lead LE. Therefore, when the adhesive AD that has been dried is cooled, the cuts CU in the heat-resistant lead LE can substantially eliminate the wrinkles that have formed in the carbon paper CP. This feature can reliably reduce the formation of wrinkle in the carbon paper CP. FIG. 6 is a schematic plan view showing the bonded joint of the carbon paper CP and the heat-resistant lead LE in the processing apparatus 1 for gas-diffusion layer sheets. The shape of the cut CU is not limited to the above-described shape.

The gas-diffusion layer sheet is not limited to the carbon paper. It is suitable that the gas-diffusion layer sheet is made of a porous material having electrical conductivity. Examples of suitable materials for the gas-diffusion layer sheet include a conductive resin, a composite of a conductive material and a resin, and a member including metallic fibers. Further, the configurations of the respective components such as the first roller, the second roller, the processing oven, the heat-resistant lead, and the anti-wrinkle part are not limited to the configurations of the respective components such as the feeding roller 10, the take-up roller 20, the drying oven 30, the heat-resistant lead LE, and the cuts CU of the present embodiment. For example, as the processing oven for performing the heat processing, a kiln may be used instead of the drying oven 30. Further, for example, the shape of the applied adhesive AD is not limited to the shape of a single continuous line, but may be the shape of at least one dashed line.

EXPLANATION OF REFERENCE NUMERALS

1 Processing Apparatus for Gas-Diffusion Layer Sheets
10 Feeding Roller
20 Take-Up Roller
30 Drying Oven (Processing Oven)
AD Adhesive (Thermosetting Resin)
CP Carbon Paper
CU Cut (Anti-Wrinkle Part)
LE Heat-Resistant Lead

What is claimed is:

1. A processing apparatus for gas-diffusion layer sheets, the processing apparatus comprising:
    a first roller around which a gas-diffusion layer sheet is wound, the gas-diffusion layer sheet being an electrically conductive porous member;
    a second roller configured to take up the gas-diffusion layer sheet wound around the first roller; and
    a processing oven configured to heat process a portion of the gas-diffusion layer sheet, the portion having been fed from the first roller but not yet taken up by the second roller, wherein
    a heat-resistant lead is provided, the heat-resistant lead having a length at least extending to the second roller through the processing oven, being configured to be taken up by the second roller, and being bonded to the gas-diffusion layer sheet impregnated with a thermosetting resin.

2. The processing apparatus according to claim 1, wherein the heat-resistant lead has, in a portion thereof, an anti-wrinkle part for substantially eliminating wrinkles that have formed in the gas-diffusion layer sheet, the portion with the anti-wrinkle part being adjacent to another portion, of the heat-resistant lead, to which the gas-diffusion layer sheet is bonded.

3. The processing apparatus according to claim 2, wherein the anti-wrinkle part is comprised of a cut formed in the portion of the heat-resistant lead.

4. The processing apparatus according to claim 1, wherein the thermosetting resin is applied to a longitudinal end portion of the heat-resistant lead such that the applied thermosetting resin is in a shape of a single continuous line extending in a width direction of the heat-resistant lead, from a vicinity of one end to a vicinity of an other end in the width direction of the heat-resistant lead, thereby bonding the heat-resistant lead to the gas-diffusion layer sheet.

5. The processing apparatus according to claim 1, wherein a longitudinal end portion of the gas-diffusion layer sheet is impregnated with the thermosetting resin, and the thermosetting resin is heated and cured in a state where the gas-diffusion layer sheet is positioned on top of the heat-resistant lead, thereby bonding the gas-diffusion layer sheet and the heat-resistant lead to each other.

\* \* \* \* \*